United States Patent [19]

Ihara

[11] 4,229,641
[45] Oct. 21, 1980

[54] AUTOMATIC WELDING APPARATUS

[75] Inventor: Yasushi Ihara, Takarazuka, Japan

[73] Assignee: Shin Meiwa Industry Co., Ltd., Nishinomiya, Japan

[21] Appl. No.: 939,151

[22] Filed: Sep. 1, 1978

[30] Foreign Application Priority Data

Sep. 1, 1977 [JP] Japan .................................. 52-105706

[51] Int. Cl.$^2$ ............................................. B23K 37/02
[52] U.S. Cl. .................................. 219/125.1; 219/159; 228/45
[58] Field of Search ............ 219/124.1, 124.33, 125.1, 219/125.11, 159, 60 A; 228/45, 48

[56] References Cited

U.S. PATENT DOCUMENTS

| | | | |
|---|---|---|---|
| 2,283,140 | 5/1942 | Johnston | 219/159 |
| 2,349,865 | 5/1944 | Hawk et al. | 219/159 |
| 2,927,195 | 3/1960 | Arnaud | 219/124.33 |
| 3,904,845 | 9/1975 | Minkiewicz | 219/159 |
| 4,014,495 | 3/1977 | Oda et al. | 219/125.1 |
| 4,081,651 | 3/1978 | Randolph et al. | 219/159 |
| 4,149,061 | 4/1979 | Mort et al. | 219/124.33 |

Primary Examiner—Roy N. Envall, Jr.
Assistant Examiner—Clifford C. Shaw
Attorney, Agent, or Firm—Griffin, Branigan & Butler

[57] ABSTRACT

An automatic welding apparatus includes a movable welding torch carried by a positioning assembly mounted on a pair of turn frames adapted to be rotated about a horizontal axis. The positioning assembly is capable of orienting the welding torch with respect to a workpiece holder also mounted on the pair of turn frames. A computer control arrangement accurately positions the torch along three mutually orthogonal axes during welding, and controls the angular position of the pair of turn frames about the horizontal axis. In alternative embodiments, the workpiece holder is mounted on a pair of stationary stands so that the holder is independently rotatable around a horizontal axis which may be coincident with, or offset from, the axis of rotation of the turn frames. The arrangement permits automatic torch positioning for downward butt welding or horizontal fillet welding on the interior or exterior of long box-like or tubular members.

19 Claims, 24 Drawing Figures

AUTOMATIC WELDING APPARATUS

BACKGROUND OF THE INVENTION

This invention relates to an automatic welding apparatus for performing downward butt or horizontal fillet welding operations on the exterior and/or interior sheet-to-sheet joint portions of long, box-like or tubular workpieces having narrow entry apertures and more particularly to an arrangement wherein a movable welding torch is carried by a positioning assembly mounted on a pair of turn frames rotatable around a horizontal axis.

Figure 7:
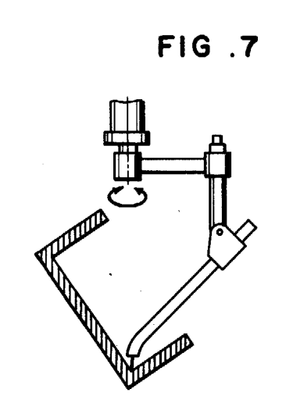
FIGS. 7 and 8 illustrate downward butt welding and horizontal fillet welding, respectively.
Figure 8:
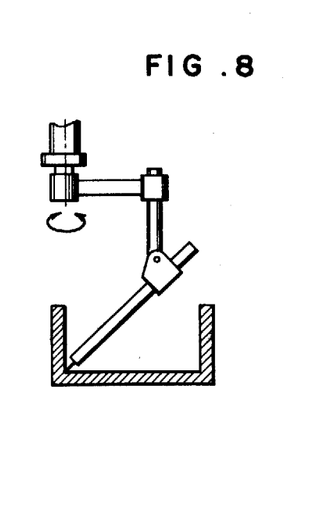
Figure 9:
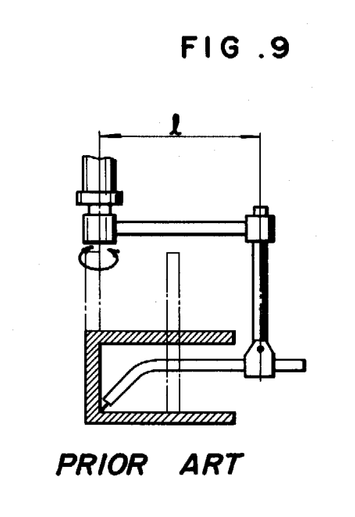
FIG. 9 illustrates a prior art automatic welding arrangement.

It is well known in the prior art to movably mount a welding torch by utilizing a positioning assembly adapted to control the spatial orientation of the tool with respect to a workpiece secured to a movable workpiece holder. For example, Oda et al. U.S. Pat. No. 4,014,495 discloses an automatic welding apparatus wherein the welding torch is secured to a composite frame capable of movement in the longitudinal, lateral and vertical directions as well as being rotatable around a vertical axis. In this particular arrangement, the workpiece holder is adapted to be rotated around a horizontal axis as well as being movable in two mutually orthogonal directions such as the longitudinal and lateral directions. By dividing the necessary degree of freedom of movement between the workpiece holder and the welding tool, it is possible to obtain an orientation of the workpiece with respect to the welding tool which allows downward butt welding and horizontal fillet welding. By way of definition, downward butt welding and horizontal fillet welding are illustrated in FIGS. 7 and 8, respectively, of the present application. However, this approach involves a complex structure as well as demanding intricate computer programming in order to correlate the position of a movable workpiece with respect to a movable welding tool. Additionally, a problem arises when it is desired to perform such downward butt or horizontal fillet welding on the interior of long, box-like or tubular workpieces having narrow entry apertures. To overcome this problem, Oda et al provide a torch fixture with a long arm having a crank or folded portion, as illustrated in FIG. 9 herein, which allows the torch fixture to gain entry to the welding line without interference from the workpiece. By utilizing a longer fixture arm, the accuracy of positioning the torch is reduced and the complexity of the apparatus is increased thereby magnifying maintenance and production considerations.

SUMMARY OF THE INVENTION

An object of this invention is to provide an automatic welding apparatus particularly adapted for welding the interior and/or exterior joint portions of long, box-like or tubular workpieces having narrow entry apertures.

A further object of the invention is to provide an automatic welding apparatus which is inexpensive to manufacture and easy to maintain.

It is another object of this invention to provide an improved automatic welding apparatus having a structure which reduces the need for complex control programming.

Yet another object of the invention is to provide an automatic welding apparatus having a movable tool positioning arrangement which is simple and adapted to perform welding operations on the interior of long, box-like workpieces having narrow entry apertures.

It is yet another object of this invention to provide an automatic welding apparatus for performing downward butt welding and horizontal fillet welding, and particularly adapted to perform such welding operations on the interior and exterior joint portions of box-like workpieces.

In accordance with the principles of the present invention, an automatic welding apparatus comprises a welding torch carried by a positioning assembly mounted on a pair of turn frames rotatable around a horizontal axis. The positioning assembly is capable of moving the welding torch in three mutually orthogonal directions. In addition, the welding torch is rotatable around a vertical axis and includes a tip portion bent at a 45° angle to the rotational axis. A computer control arrangement is included for positioning the torch with respect to a workpiece secured to a workpiece holder mounted on the pair of turn frames. In an alternative arrangement, the workpiece holder is secured to a pair of stationary stands and adapted for rotation around an axis parallel to, or coincident with, the axis of rotation of the turn frames.

BRIEF DESCRIPTION OF THE DRAWINGS

The foregoing and other object, features, and advantages of the invention will be apparent from the following more particular description of the preferred embodiments of the invention, as illustrated in the accompanying drawings. The drawings are not necessarily to scale, emphasis instead being placed on illustrating the principles of the invention.

DETAILED DESCRIPTION OF THE PREFERRED EMBODIMENTS

Figure 1:
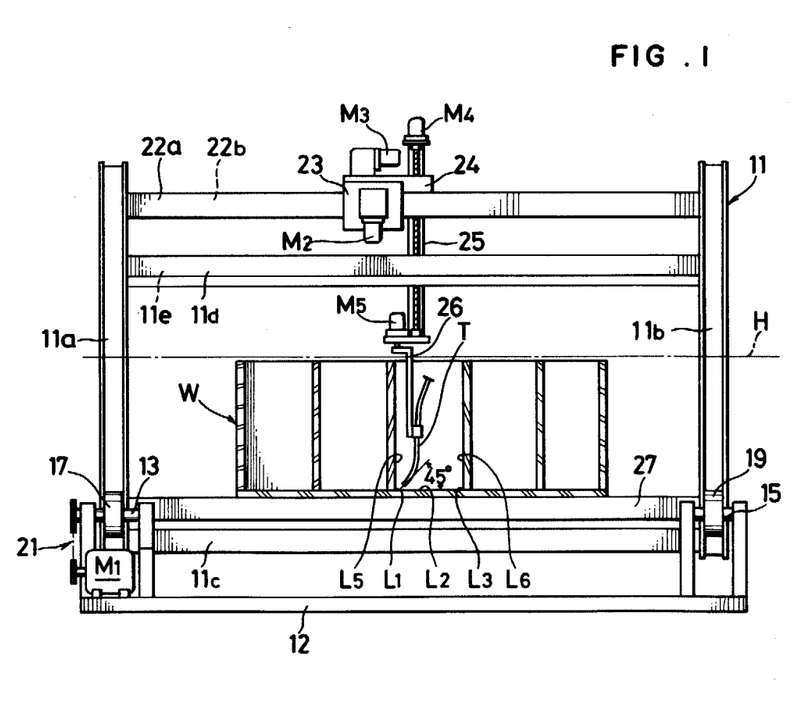
FIG. 1 is a front view showing one embodiment of the present invention.
Figure 2:
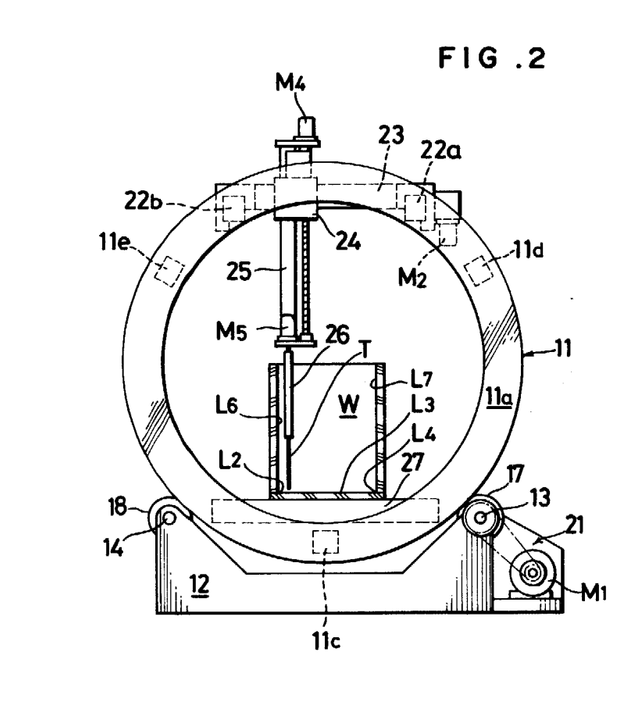
FIG. 2 is a left side view of the welding apparatus illustrated in FIG. 1.

Referring to FIGS. 1 and 2, an automatic welding apparatus is depicted comprising a generally cylindrical frame body 11 adapted to be rotated about a horizontal axis H. Frame body 11 comprises two circular end rings 11a and 11b spaced apart and fixedly oriented with respect to one another by three connecting members 11c, 11d and 11e. A floor plate 12 is adapted to support the two circular end rings 11a and 11b on four rollers each of which is rotatably mounted on a shaft. Three of the rollers, 17, 18 and 19, and their respective support shafts 13, 14 and 15, are shown in FIGS. 1 and 2. In order to drive the cylindrical frame about the horizontal axis, an electric motor $M_1$ is included which is coupled to the roller 17 by a suitable drive train 21 including a chain or belt arrangement.

A welding torch T is movably mounted to a positioning assembly comprising travellers 23 and 24 and a movable member 25. The positioning assembly is supported by guide bars 22a and 22b which are horizontally disposed along the frame body 11 so that they are parallel to one another and secured between the end rings 11a and 11b. The traveller 23 is mounted on the guide bars 22a and 22b and includes a motor $M_2$ adapted to drive the traveller 23 along the guide bars 22a and 22b. Traveller 24 is mounted on the traveller 23 so as to be slidable between the guide bars 22a and 22b. A motor $M_3$ is provided on traveller 24 for moving traveller 24 with respect to traveller 23. A member 25 is mounted on the traveller 24 and is driven in the vertical direction as seen in FIGS. 1 and 2 by an electric motor $M_4$. The welding torch T is supported by a torch fixture 26 which is in turn attached to the shaft of a motor $M_5$. Motor $M_5$ is supported on the lower portion of member 25 and rotatably drives torch fixture 26 about a vertical axis.

The welding torch T has a free end portion suitably shaped for fillet welding. During the welding operation the torch fixture 26 holds or orients the torch T so that the welding point is aligned with the rotational axis of the torch fixture 26. Additionally, the tip portion of the welding torch T is inclined at a 45° angle with respect to the axis of rotation.

A workpiece fixture 27 is secured at its end to the rings 11a and 11b so that a workpiece is mounted on fixture 27 by jigs or other means, may be rotated about horizontal axis H by energizing motor $M_1$ to rotate rings 11a and 11b. As illustrated, the workpiece W may comprise a comparatively long box having several partitions provided in the interior which form compartments. In order to secure each partition in place, the welding torch T is oriented with respect to the workpiece W under the control of a computer or point-to-point controller arrangement (not shown). The controller selectively drives motors $M_1$-$M_5$ so that the tip of the torch T is moved along each of a plurality of weld lines $L_1$-$L_8$. As the torch T is moved, the controller selectively controls a welder in known manner so that welding takes place along the lines $L_1$-$L_8$.

Figure 3:
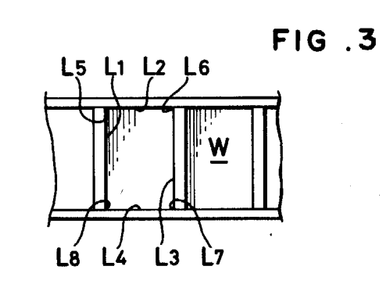
FIG. 3 is a fragmented, top view of a workpiece.
Figure 4:
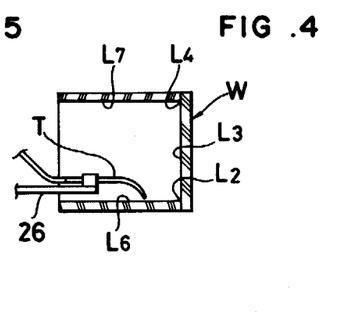
FIG. 4 and FIG. 5 illustrate a sequence of welding modes performed by the invention depicted in FIGS. 1 and 2.
Figure 5:
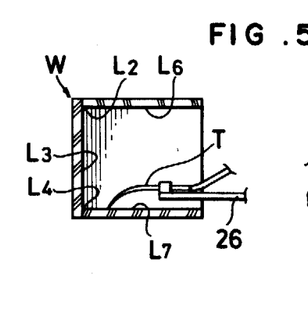

Referring to FIGS. 1-5 the welding operation begins with the cylindrical frame body 11 positioned about the horizontal axis so that welding lines $L_1$-$L_4$ are horizontally disposed and face upwardly, as shown in FIGS. 1-3. This arrangement allows for horizontal fillet welding when the welding torch T is moved along welding lines $L_1$, $L_2$, $L_3$ and $L_4$ in a continuous sequence. In order to position welding lines $L_5$ and $L_6$ for horizontal fillet welding, the cylindrical frame body 11 is rotated 90° in a counterclockwise direction from the position seen in FIG. 2, so that the workpiece W is oriented as shown in FIG. 4. After the welding of lines $L_5$ and $L_6$ is completed the frame body 11 is rotated in a clockwise direction so that the workpiece W is positioned as illustrated in FIG. 5 thus allowing for horizontal fillet welding of welding lines $L_7$ and $L_8$.

Assuming that the workpiece includes a plurality of compartments, the previously described sequence of operations would be performed in each compartment. In each case, the positioning assembly would withdraw the welding tool from a compartment upon the completion of the welding operation and insert the tool in a compartment requiring welding.

As a modification of the embodiment described above, the workpiece holder 27 may also be rotatably mounted about an axis perpendicular to the horizontal axis H so that all welding lines $L_1$-$L_8$ can be positioned for downward welding rather than horizontal fillet welding.

Figure 6:
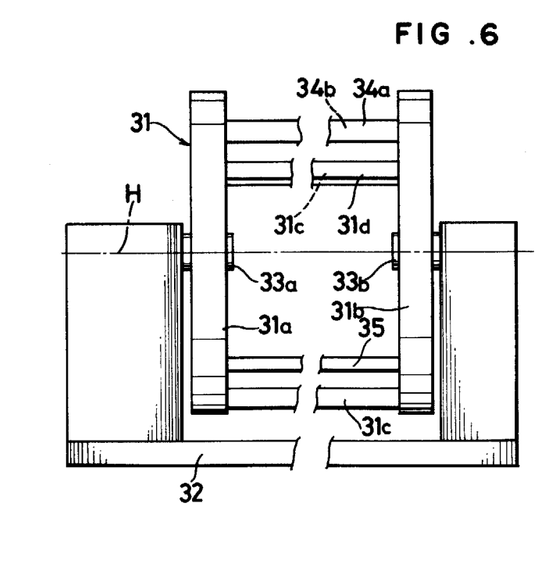
FIG. 6 is a front view illustrating a second embodiment of the present invention.

FIG. 6 illustrates an alternative embodiment wherein a cylindrical frame body 31 comprises circular end rings 31a and 31b which are spaced from one another and fixedly oriented by connecting members 31c-31e. Guide bars 34a and 34b are provided for mounting a positioning assembly. A workpiece fixture 35 is mounted between end rings 31a and 31b. In order to rotate the cylindrical frame body 31 about the horizontal axis H, the end rings 31a and 31b are coupled to horizontally disposed shafts 33a and 33b supported on a floor plate 32. A suitable drive means, not shown, is coupled to at least one of the shafts in order to rotate the cylindrical frame body 31 about the horizontal axis H. The arrangement of FIG. 6 eliminates the need for supporting rollers like rollers 17 and 18 shown in FIG. 2.

In the foregoing embodiments, the entire degree of freedom is afforded to torch fixture 26 in order to control the relative position of the torch fixture 26 with respect to workpiece fixture 27 or 35. However, the entire degree of freedom may be divided between torch fixture 26 and workpiece fixture 27 or 35. Furthermore, according to the foregoing embodiments, the relative positions of torch fixture 26 to workpiece 27 or 35 are controllably determined by rectangular coordinates. However, it should be clear that such positions can be determined by cylindrical or polar coordinates.

Figure 11:
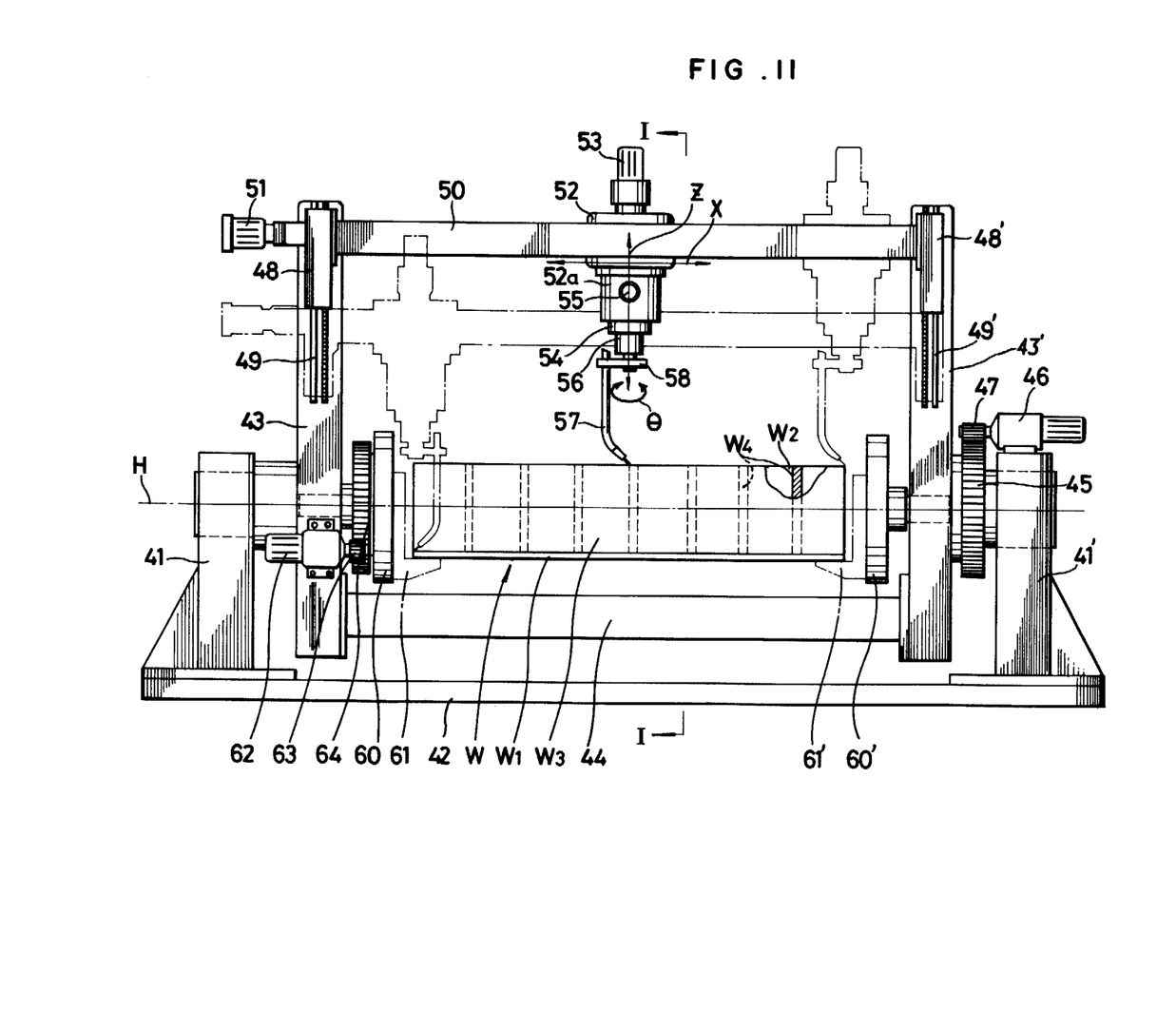
FIG. 11 is a front view of a third embodiment of the invention.
Figure 12:
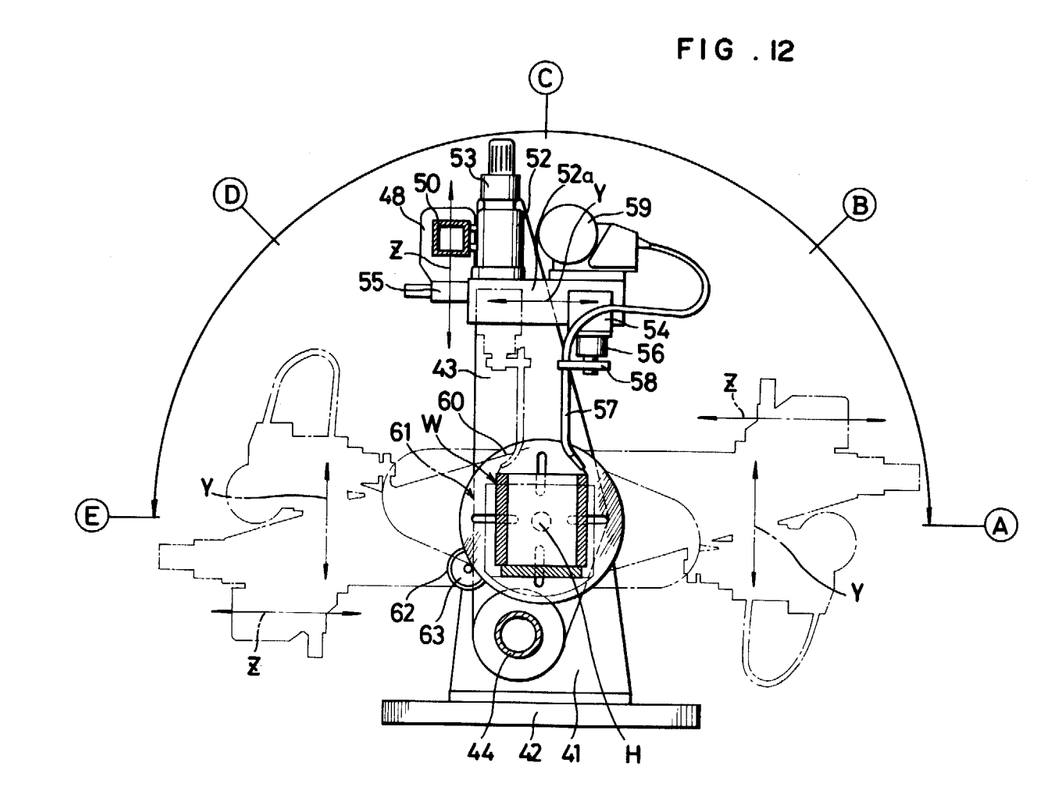
FIG. 12 is a partially sectioned view taken along the line I—I shown in FIG. 11.

FIG. 11 illustrates a third embodiment of the invention wherein a pair of turn frames 43 and 43' are connected to one another by a crossbeam 44. The assembly is rotatably supported in stands 41 and 41' provided at the ends of a floor plate 42 and a reversible motor 46 is provided to drive the assembly in an arc about the horizontal axis H. The reversible motor includes a braking arrangement and has a drive shaft provided with a minor gear 47 adapted to engage a major gear 45 connected to turn frame 43'. Both turn frames 43 and 43' are driven about the horizontal axis by motor 46 and locked in any of several preset and equally spaced angular positions A, B, C, D and E as shown in FIG. 12. The frames can be controllably driven in time utilizing a limit switch arrangement (not shown).

The torch positioning assembly carried by the turn frames 43 and 43' includes a crossbeam 50 which is supported by Z-axis sliders 48 and 48' guided on rails 49 and 49'. In order to drive the assembly along the Z-axis, a reversible motor assembly 51 is connected to lefthand slider 48 and includes a braking arrangement as well as a rack and pinion transmission means. A traveller 52 is mounted on the crossbeam 50 and is adapted to move along the X-axis. A reversible braking motor 53, drives the traveller 52. A slidable extension member 52a is mounted on the lower end of traveller 52 and the torch fixture 54 is mounted on member 52a. A reversible braking motor 55 drives member 52a and the torch fixture along the Y-axis. A reversible braking motor 56 is mounted on torch fixture 54 and drives a torch 57 rotationally along a path $\theta$ about the Z axis.

Figure 13:
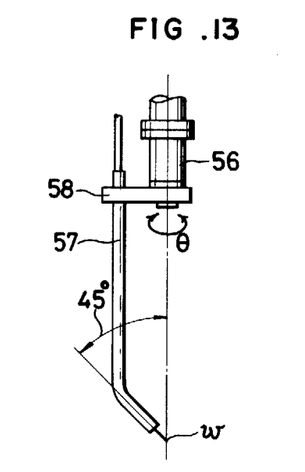
FIG. 13 is an enlarged view of a welding torch according to this invention.

FIG. 13 illustrates details of the welding torch assembly, which includes the torch 57 having one end affixed to a horizontal arm 58 which is rigidly attached to the output shaft of motor 56 so that the stem portion of the torch extends parallel to the Z axis. In order to dispose the end of a welding wire w along the Z axis (center of path $\theta$) the tip portion of the welding torch 57 is inclined approximately 45° with respect to the Z-axis. A device 59 (FIG. 12) is mounted on extension 52a and feeds the welding wire.

A pair of workpiece holders 60 and 60' (FIG. 11) are mounted on turn frames 43 and 43' so that they may be rotatably driven about the horizontal axis H by a reversible motor assembly 62 having an output shaft including a minor gear 63 which operatively engages a major gear 64 located on the workpiece 60. Jigs 61 and 61' are provided to couple the workpiece W to the workpiece holders 60 and 60'.

Figure 10:
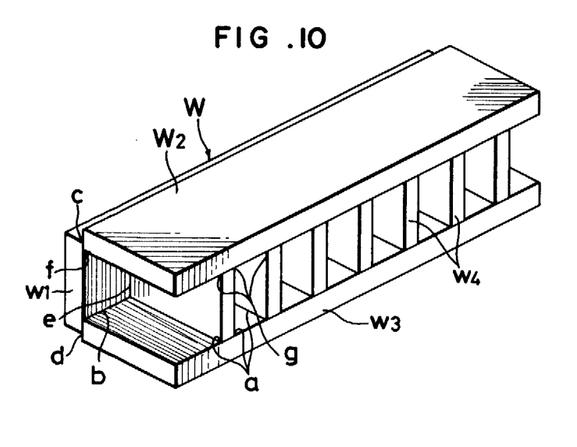
FIG. 10 is a perspective view illustrating a typical workpiece.

The above-described assembly is particularly adapted for welding operations involving long, box-like structures such as workpiece W shown in FIG. 10. The workpiece W comprises an elongated bottom plate $W_1$, upper and lower side plates $W_2$ and $W_3$ as well as a plurality of partition plates $W_4$. The plates $W_1$-$W_4$ are correctly oriented with respect to one another by an operator and preliminarily joined before the automatic welding operation begins.

Prior to initiating the automatic welding operation, the turn frames 43 and 43' are locked in the C position as illustrated in FIG. 12, and the workpiece W is mounted by jigs 61 and 61' so that the open apertures face towards the welding torch 57. The welding operation is automatically performed in a preset sequence of steps under the control of a preprogrammed computer or control device (not shown) which controls the various motors as well as the welding current and wire feed. FIGS. 14-20 illustrate the orientation of the apparatus and associated workpiece W during the various steps required to weld the joints of a workpiece like that shown in FIG. 10.

Figures 14, 15, 16, 17, 18, 19, 20:
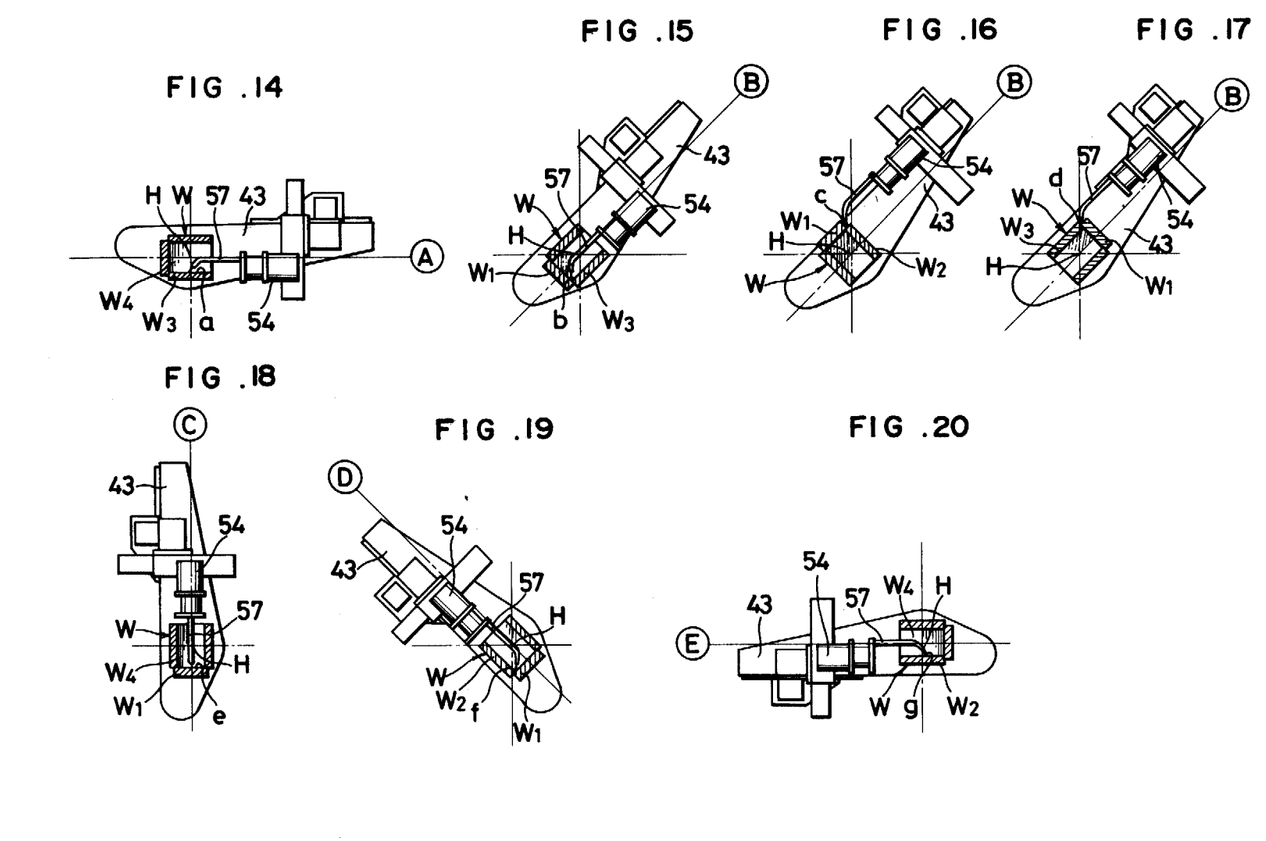
FIGS. 14–20 illustrate a sequence of welding operations performed by the embodiment shown in FIGS. 11 and 12.

After the workpiece is mounted, the automatic welding sequence is initiated. First, the turn frames 43 and 43' are rotated by reversible motor 46 from position C to position A as illustrated in FIG. 14. The intersections of partition plates $W_4$ with lower side plate $W_3$ form joint portions a which are presented for horizontal fillet welding. The computer controls the spacial orientation (X, Y, Z and $\theta$) of the welding torch 57 with respect to the workpiece W to conduct the welding operation.

Referring to FIG. 15, upon completion of the welding operation performed at position A, the reversible motor 46 drives turn frames 43 and 43' to position B while the welding torch 57 remains inserted in the compartment of workpiece W so that interior joint portion b for joining $W_1$ and $W_3$ is oriented for downward welding.

After $W_1$ is welded to $W_3$ along joint b, the control apparatus maintains the turn frames 43 and 43' in position B and, after removing welding torch 57 from the workpiece aperture, the workpiece W is rotatably driven around the horizontal axis H by motor 62 so that exterior joint portions c and d are successively oriented for downward fillet welding as illustrated in FIGS. 16 and 17. By these operations, $W_1$ is welded to $W_2$ and $W_1$ is welded to $W_3$.

The welding tool is then driven so that it is reinserted into the interior of the workpiece W and the turn frames 43 and 43' are swung to position C as seen in FIG. 18 so that joint portions e may be presented for horizontal fillet welding of $W_1$ to $W_4$. Next, the turn frames 43 and 43' are moved to position D as seen in FIG. 19 allowing interior joint portions f to be positioned for downward fillet welding of $W_1$ and $W_2$. Finally, turn frames 43 and 43' are moved to position E as illustrated in FIG. 20 for horizontal fillet welding of $W_2$ and $W_4$ along joint portion g.

Figure 21:
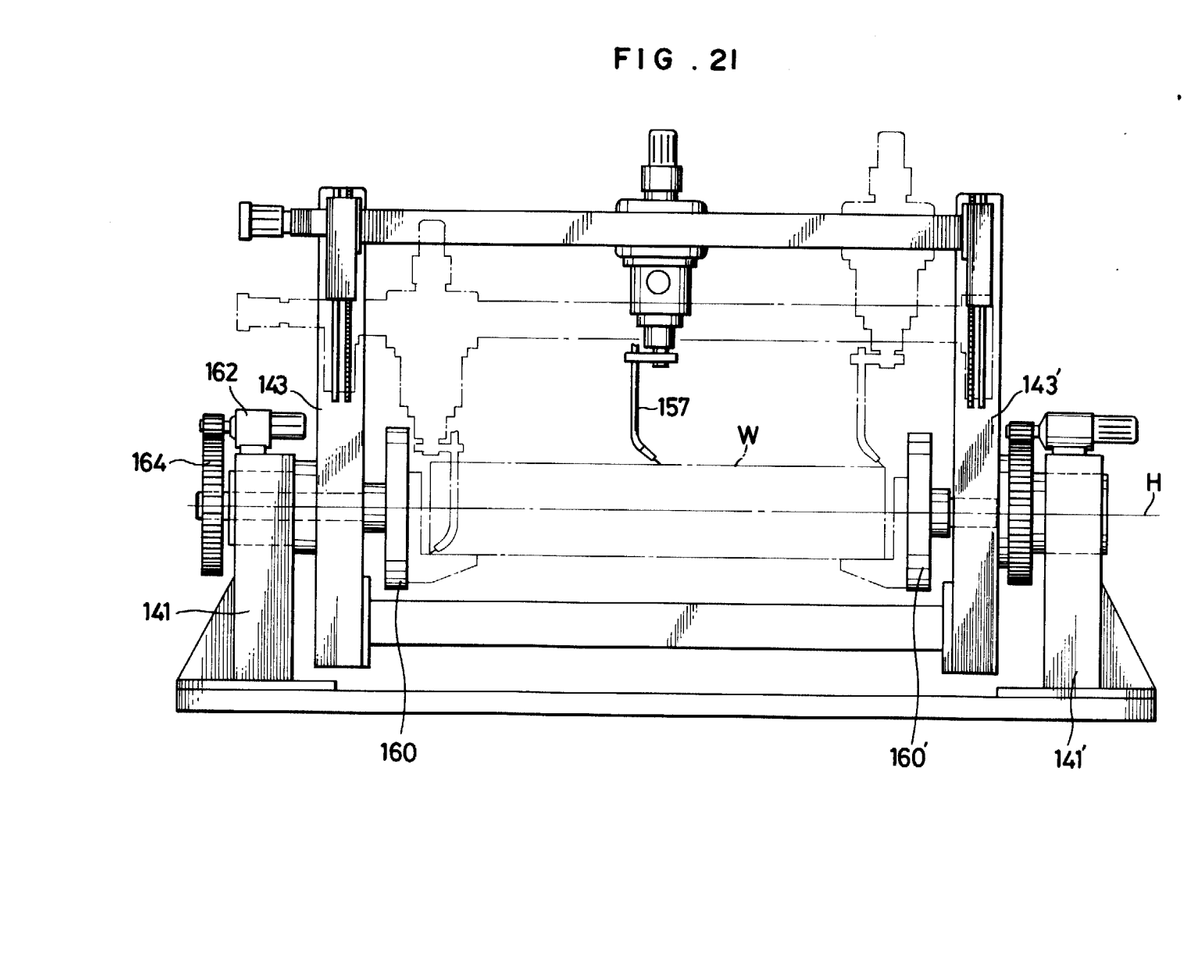
FIG. 21 is a front view illustrating a fourth embodiment of the invention.

FIG. 21 illustrates a fourth embodiment of the invention wherein a different arrangement is provided for moving the work about the horizontal axis H. A pair of turn frames 143 and 143' are rotatably mounted on stand 141 and 141' in the conventional manner. In order to rotate a workpiece W around the horizontal axis H, a pair of workpiece holders 160 and 160' are rotatably mounted on a shaft having a major gear 164 adapted to engage a minor gear located on the output shaft of a reversible motor 162. Under the control of a computer, the reversible motor 162 positions the workpiece W around the horizontal axis H allowing a torch 157 to conduct its welding operations. Positioning of the torch is accomplished by a positioning assembly like that described with reference to FIGS. 11 and 12.

Figure 22:
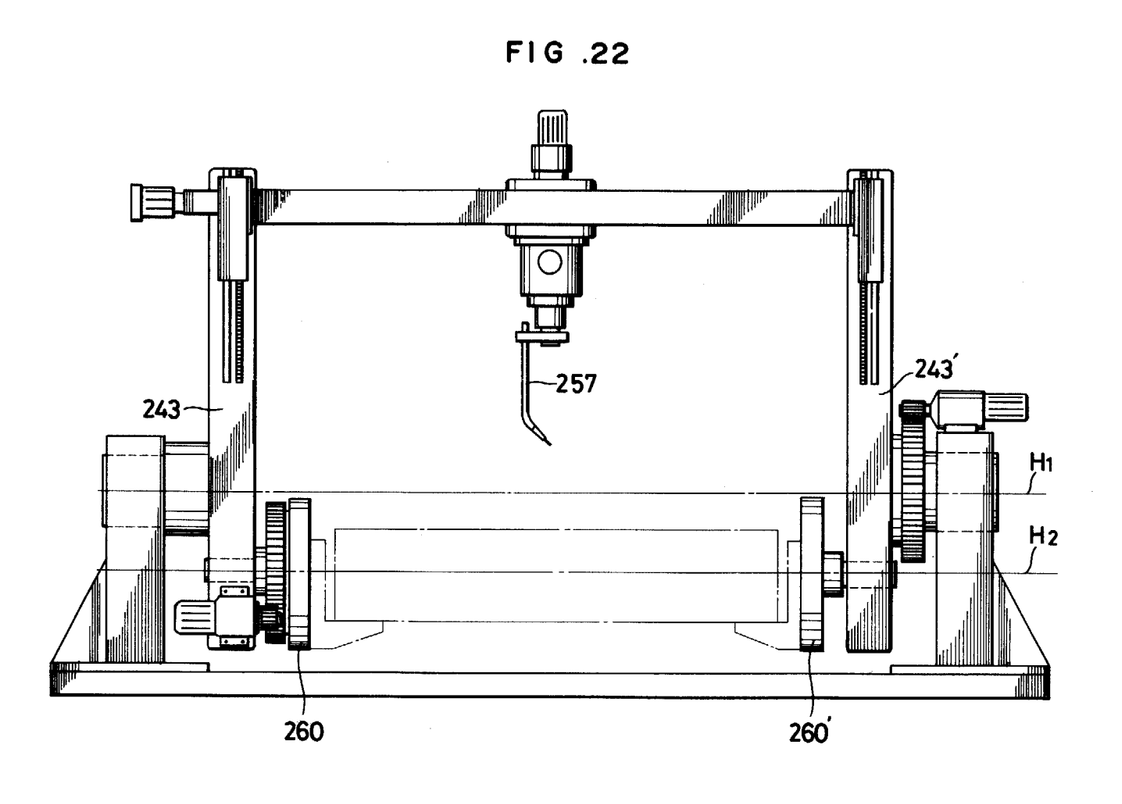
FIG. 22 is a front view of a fifth embodiment of the invention.

FIG. 22 shows a fifth embodiment of the invention wherein an arrangement is provided for rotating the workpiece about a horizontal axis which is offset from the axis about which the turn frames are rotated. A workpiece holder assembly 260 and 260' is mounted for rotation about a horizontal axis H-2 parallel to and spaced from the horizontal axis H-1 about which a pair of turn frames 243 and 243' are mounted for rotation as described above. This arrangement is specifically adapted for welding operations involving frames having shorter arms and smaller working areas. Again, positioning of the torch is accomplished as described with reference to FIGS. 11 and 12.

Figure 23:
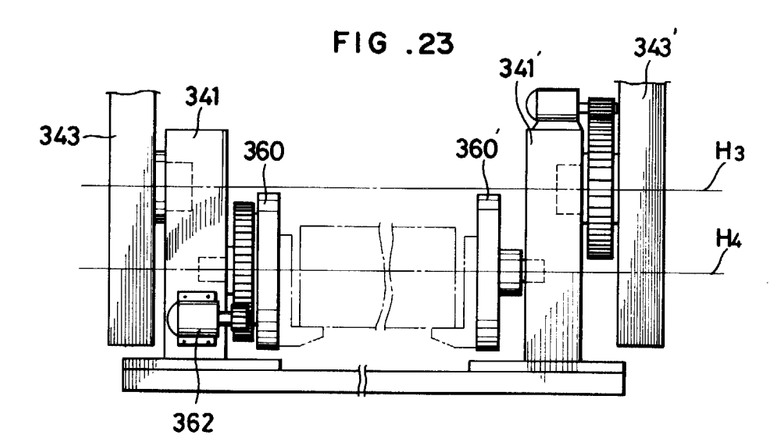
FIG. 23 is a front view of a sixth embodiment of the invention.

FIG. 23 shows a further embodiment where a pair of turn frames 343 and 343' are rotatably supported on stands 341 and 341' so as to be rotatably positionable around a horizontal axis H-3. Workpiece holders 360 and 360' are located between the stands 341 and 341' and may be rotated around a horizontal axis H-4 which is spaced from and parallel to the first horizontal axis H-3. A reversible motor assembly 362 is provided to drive the workpiece holders 360 and 360' about the horizontal axis H-4.

Figure 24:
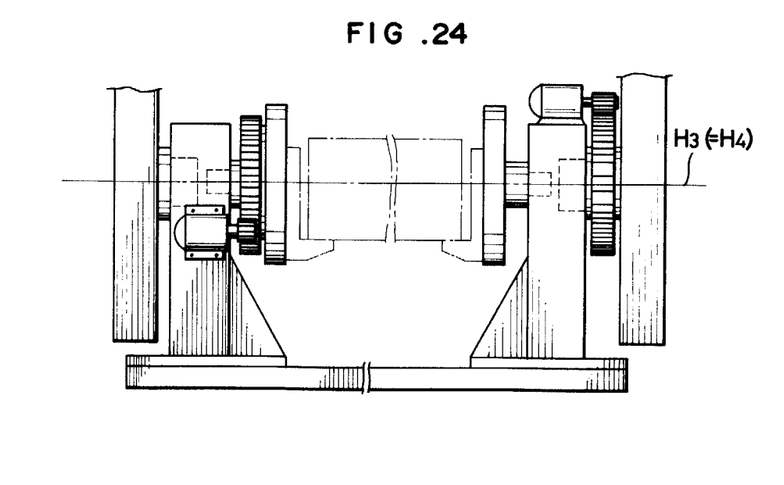
FIG. 24 is a front view illustrating a modification of the sixth embodiment.

FIG. 24 illustrates an arrangement similar to that shown in FIG. 23, but wherein H-3 coincides with H-4.

While the invention has been particularly shown and described with reference to preferred embodiments thereof, it will be understood by those skilled in the art that various alterations in form and detail may be made therein without departing from the spirit and scope of the invention.

The embodiments of the invention in which an exclusive property right or privilege is claimed are defined by the following claims:

I claim:

1. An automatic welding apparatus for welding the interior joint portions of long box-like or tubular workpieces, said welding apparatus comprising a pair of spaced-apart, but interconnected, turn frames swingable in unison around a horizontal axis passing through the two frames, said turn frames having three members mounted therebetween, said three members being slidable in respectively said horizontally axial direction, a second direction orthogonal to said horizontally axial direction and a third direction orthogonal to said second direction; a workpiece-fixture means for holding said box-like or tubular workpieces; a welding torch; and a fixture means for holding said welding torch, wherein said workpiece-fixture means is mounted on said turn frames to move in unison therewith and said torch fixture means is mounted on one of said sliding members for rotation around an axis in said second direction or said third direction, so that said workpiece-fixture means and said torch fixture means can be respectively positioned relative to one another in three dimensions and so that the attitudes of both of these members can be changed in unison relative to the earth, for welding the interior joint portions of long box-like or tubular workpieces.

2. An automatic welding apparatus comprising a pair of spaced-apart, but interconnected, turn frames mounted on a stationary frame to be swingable around a horizontal axis passing through the two frames, wherein imaginary lines parallel to said horizontal axis extending between the outer peripheries of said turn frames define an imaginary cage; a beam guide mounted between said turn frames and extending in said horizontal direction; a first member mounted on said beam guide for slidable movement in said horizontally axial direction; a second member mounted on said first sliding member for slidable movement in a second direction orthogonal to said horizontal direction; a third member mounted on said second sliding member for slidable movement in a third direction orthogonal to said horizontal direction and to said second direction; a welding torch; a fixture means for holding said torch, mounted on said third sliding member; and a workpiece fixture mounted between said turn frames for mounting a work-piece thereto within said imaginary cage, wherein said torch fixture is made for rotation around an axis in said second direction or said third direction, so that said workpiece fixture and said torch fixture means can be positioned relative to one another in three dimensions within said imaginary cage and so that the attitudes of both these members and the imaginary cage, can be changed, in unison, relative to the stationary frame.

3. An automatic welding apparatus as recited in claim 1 or claim 2, wherein said turn frames are swingably supported by shafts at said horizontal axis and horizontally extending along said horizontal axis.

4. An automatic welding apparatus as recited in claim 1 or claim 2, wherein said turn frames have round perimeters and are supported on rollers which are carried by horizontally extending shafts.

5. An automatic welding apparatus as recited in claim 1 wherein said workpiece fixture is positioned for mounting the workpiece within an imaginary cage defined by the outer peripheries of the turn frames.

6. An automatic welding apparatus as in claim 1 wherein said turn frames are swingable in unison through an angle greater than 90° around the horizontal axis.

7. An automatic welding apparatus comprising a work piece fixture rotatable around a first horizontal axis; a welding torch; a fixture means for holding said welding torch; a stationary main frame; a pair of turn frames mounted on said stationary main frame to be swingable around a second horizontal axis passing through said turn frames, said workpiece fixture and said fixure means being mounted between said turn frames; and means mounted on said turn frames for following the attitude changes of said turn frames and for positioning said torch fixture means in a spatial position in three dimensions relative to said turn frames including three members supported by said turn frames for slidable movement in respectively said horizontal direction, a second direction orthogonal to said horizontal direction and a third direction orthogonal to said second direction, said torch fixture means being rotatable around an axis in said second direction or said third direction; said stationary main frame having a pair of supports, each positioned adjacent a turn frame with the turn frame being swingably mounted thereon; and a turn-frame driving means mounted on either said stationary main frame or a turn frame for engaging the other of said stationary main frame or turn frame to swing said turn frames relative to said stationary main frames.

8. An automatic welding apparatus as recited in claim 7, wherein said turn frames and said workpiece fixture are co-axially disposed.

9. An automatic welding apparatus as recited in claim 7 or claim 8, wherein said workpiece fixture is mounted on said turn frame, and including a workpiece driving means for said workpiece fixture, said workpiece driving means being mounted on one of said turn frames.

10. An automatic welding apparatus as recited in claim 7 or claim 8, wherein said workpiece fixture is rotatably mounted on said stationary main frame, and including a workpiece driving means for said workpiece fixture, said driving means being mounted on a fixed stand.

11. An automatic welding apparatus as recited in claim 7, wherein said workpiece fixture is supported by a fixed stand.

12. An automatic welding apparatus comprising:
a pair of turn frames adapted for rotation about a horizontal axis through an angle greater than 90°;
a guide means mounted on and between said turn frames so that its attitude is changed in unison with that of said turn frames and being parallel to said horizontal axis;
a welding torch positioning assembly mounted on said guide means so that its attitude is changed in unison therewith including:
  (1) A first sliding member mounted on said guide means so as to be movable in a first direction parallel to said horizontal axis;
  (2) a second sliding member mounted on said first sliding member so as to be movable in a second direction orthagonal to said first direction;
  (3) a third sliding member mounted on said second sliding member so as to be movable in a third direction orthogonal to said first and said second directions;

(4) a welding torch fixture attached to an end of said third sliding member so as to be rotatable about an axis parallel to said third direction of movement;

a welding torch mounted to said torch fixture so that said torch may be located in a predetermined position with respect to a workpiece holder.

13. An automatic welding apparatus as recited in claim 12 wherein said turn frames are rotatably supported on rollers at least one thereof being driven, carried by horizontally extending shafts.

14. An automatic welding apparatus as recited in claim 12 wherein said guide means comprises a beam.

15. An automatic welding apparatus as recited in claim 12 wherein said workpiece holder is rotatable in unison with said turn frames, about said horizontal axis.

16. An automatic welding apparatus as recited in claims 12 or 15 wherein said workpiece holder is supported by said turn frames.

17. An automatic welding apparatus as recited in claims 12 or 15 wherein said workpiece holder is supported by a fixed stand.

18. An automatic welding apparatus as recited in claim 12 wherein said turn frames are rotatably mounted on shafts for rotation about said horizontal axis.

19. An automatic welding apparatus as recited in claim 12 or 13 wherein said workpiece holder is mounted for rotation about an axis parallel to but spaced from said horizontal axis.

* * * * *